United States Patent
Hristov (10) Patent No.: US 10,554,734 B2
(45) Date of Patent: *Feb. 4, 2020

(54) RUNTIME GENERATION OF APPLICATION PROGRAMMING INTERFACES FOR REMOTE PROCEDURE CALL SERVICES

(71) Applicant: VMware, Inc., Palo Alto, CA (US)

(72) Inventor: Rostislav Hristov, Sofia (BG)

(73) Assignee: VMware, Inc., Palo Alto, CA (US)

( * ) Notice: Subject to any disclaimer, the term of this patent is extended or adjusted under 35 U.S.C. 154(b) by 207 days.

This patent is subject to a terminal disclaimer.

(21) Appl. No.: 15/640,193

(22) Filed: Jun. 30, 2017

(65) Prior Publication Data

US 2017/0302729 A1 Oct. 19, 2017

Related U.S. Application Data

(63) Continuation of application No. 14/562,418, filed on Dec. 5, 2014, now Pat. No. 9,699,249.

(51) Int. Cl.
*H04L 29/08* (2006.01)
*H04L 29/06* (2006.01)
*G06F 9/54* (2006.01)
*H04W 4/60* (2018.01)

(52) U.S. Cl.
CPC .............. *H04L 67/10* (2013.01); *G06F 9/547* (2013.01); *H04L 67/42* (2013.01); *H04W 4/60* (2018.02)

(58) Field of Classification Search
CPC ......... G06F 9/547; H04L 67/10; H04L 67/42; H04W 4/003; H04W 4/60
See application file for complete search history.

(56) References Cited

U.S. PATENT DOCUMENTS

| | | | | |
|---|---|---|---|---|
| 2007/0073771 A1* | 3/2007 | Baikov | ................ | G06F 8/65 |
| 2008/0140759 A1* | 6/2008 | Conner | ................ | H04L 67/16 |
| | | | | 709/201 |
| 2014/0237452 A1 | 8/2014 | Wischik et al. | | |

OTHER PUBLICATIONS ieblog article "Asynchronous Programming in JavaScript with 'Promises'," Sep. 11, 2011 to Podwysocki et al. ("Podwysocki").

* cited by examiner

*Primary Examiner* — June Y Sison
(74) *Attorney, Agent, or Firm* — Patterson + Sheridan, LLP (57) ABSTRACT

An application specific interface (API) for a service that is accessible by remote procedure calls is generated at run-time from an interface language definitions file. In operation, a client application requests a connection to a server and then a runtime API generator connects to the server and downloads an interface definition language (IDL) file that defines services provided by the server. The runtime API generator parses the IDL file and generates the corresponding service API. Subsequently, upon receiving a client application request, the API generator generates a set of instructions that, when executed, emit one or more remote procedure calls that cause the server to implement the client application request. Because the API is generated at run-time, the runtime API generator enables client applications that are implemented in dynamically typed languages to access the service by providing access to the data type metadata that cannot be expressed in such languages.

20 Claims, 5 Drawing Sheets

```
var vim = new Proxy({}, {
    get: function(target, name) {
        if (!target.hasOwnProperty(name)) {
            Object.defineProperty(target, name, {
                value: createClassFromMetadata(name)
            });
        }
        return target[name];
    }
});
```

Proxy Class Example
410

FIGURE 4A

```
var vsphere = require("vsphere");

vsphere.createVimService("vc1.local").then(function(service) {
    var sessionManager, vimPort = service.vimPort;
    vimPort.retrieveServiceContent(new vim.ManagedObjectReference({
        type: "ServiceInstance",
        value: "ServiceInstance"
    })).then(function(content) {
        sessionManager = content.sessionManager;
        return vimPort.login(sessionManager, "user", "pass");
    }).then(function(session) {
        return vimPort.logout(sessionManager);
    });
});
```

Basic Connection Example
420

FIGURE 4B

```
import { createVimService } from "vsphere";

(async function() {
    let service = await createVimService("vc1.local");
    let vimPort = service.vimPort;
    let content = await vimPort.retrieveServiceContent(new vim.ManagedObjectReference({
        type: "ServiceInstance",
        value: "ServiceInstance"
    }));
    let session = await vimPort.login(content.sessionManager, "root", "pass");
    await vimPort.logout(content.sessionManager);
})();
```

Basic Connection Example Using Next Generation JavaScript Syntax
430

FIGURE 4C

RUNTIME GENERATION OF APPLICATION PROGRAMMING INTERFACES FOR REMOTE PROCEDURE CALL SERVICES

CROSS-REFERENCE TO RELATED APPLICATION(S)

This application is a continuation of, and claims the benefit of U.S. patent application Ser. No. 14/562,418 filed Dec. 5, 2014 and entitled "Runtime Generation of Application Programming Interfaces for Remote Procedure Call Services," which is incorporated by reference herein in its entirety.

BACKGROUND

Some client/server based applications implement a Remote Procedure Call (RPC) protocol that provides an abstract communication mechanism for a client to request a procedure execution on a remote server. Notably, by decoupling the client and server functionality from the transport mechanism, RPC allows a client to access a server that is connected via a network without knowledge of the transport mechanism. RPC services are usually agnostic of the programming language in which a client may be implemented. Accordingly, major service vendors often provide a client library or a software development kit (SDK) that simplifies the usage of the exposed service on a specific language platform. Such libraries often offer an object-oriented programming (OOP) interface for dealing with the remote service and hide the actual request/response message complexity. For each language that is directly supported by the service, an application programming interface (API) exposes the methods and data types that are implemented by the service. For instance, an SDK provided by a particular service may include a Java API and a C# API, enabling clients written in Java and C# respectively to easily access the service across the connecting network irrespective of the language in which the service is written. Such APIs are often pre-generated based on RPC service metadata description that can be utilized for the creation of the server and the client implementations. These APIs are aware of the data types that the service supports and eliminate the requirement of sending type metadata with each RPC message—an undesirable overhead.

However, such pre-generated APIs are constrained by the features supported by the languages in which they are written. Consequently, while generated APIs may be effectively implemented in statically-typed languages, comprehensively implementing APIs written in dynamically-typed languages, such as JavaScript and Python may be problematic. In particular, without support for static typing, such pre-generated APIs cannot utilize type introspection (also known as reflection)—the ability to examine and modify programs at runtime—thus limiting the extraction of the required service metadata. Pre-generated APIs are usually mandatory for compiled languages since the compiler program requires physical access to the linked interfaces. Interpreted languages, on the other hand, may allow on-the-fly generation of such APIs when it happens before their initial usage.

In one approach to reducing the limitations of generated APIs for dynamically-typed languages, the generated API includes data type information in a non-native format. While such an approach may adequately capture basic functionality, the size of the API required to specify the functionality provided by a service with substantial capabilities is unacceptable large, particularly for browser-based applications. In one example, the compressed prototype of an enriched (i.e., including customized type information) web service API that exposes virtual machine management software to client applications includes 40 MB of generated JavaScript. In another approach, a middle-tier written in a statically-typed language provides a language bridge that allows clients written in dynamically-typed languages to indirectly access the service. However, the middle-tier not only complicates the creation of the client application, but also increases the time required to execute the application. Consequently, there is a need for an improved dynamically-typed API generation technique.

SUMMARY

One or more embodiments provide techniques to generate an application programming interface at runtime based on an interface definition language file. A method of dynamically generating an application programming interface that enables a client to access a service provided by a server includes the steps of receiving a request to connect to a server that provides a service, and in response, connecting to the server; downloading an interface definition language file where the interface definition language file defines the service; generating interface metadata based on the interface definition language file; and in response to a request, executing a remote procedure call that causes the server to carry out the service, wherein the remote procedure call is determined based on the interface metadata.

Further embodiments of the present invention include a non-transitory computer-readable storage medium comprising instructions that cause a client/server based system to carry out one or more of the above methods as well as a client/server based system configured to carry out one or more of the above methods.

Advantageously, generating an application specific interface at runtime enables comprehensive support for client applications written in languages that do not support static types. By contrast, conventional pre-generated application specific interfaces written in such languages may not efficiently support data type information. Further, because the interface bindings are generated based on an interface definition language that specifies the provided methods and data types, the interface bindings reflect the current versions of the methods and data types provided by the service instance instead of a previous or later version of the same service. The approach disclosed herein allows the utilization of different optimization techniques that can be used for faster metadata retrieval and API generation. One example is metadata caching and the usage of a single cached copy with multiple compatible service instances. Another example is an on-demand API generation which distributes the required computation over the lifetime of the client application and doesn't spend time on interfaces that are not used.

DETAILED DESCRIPTION

Figure 1:
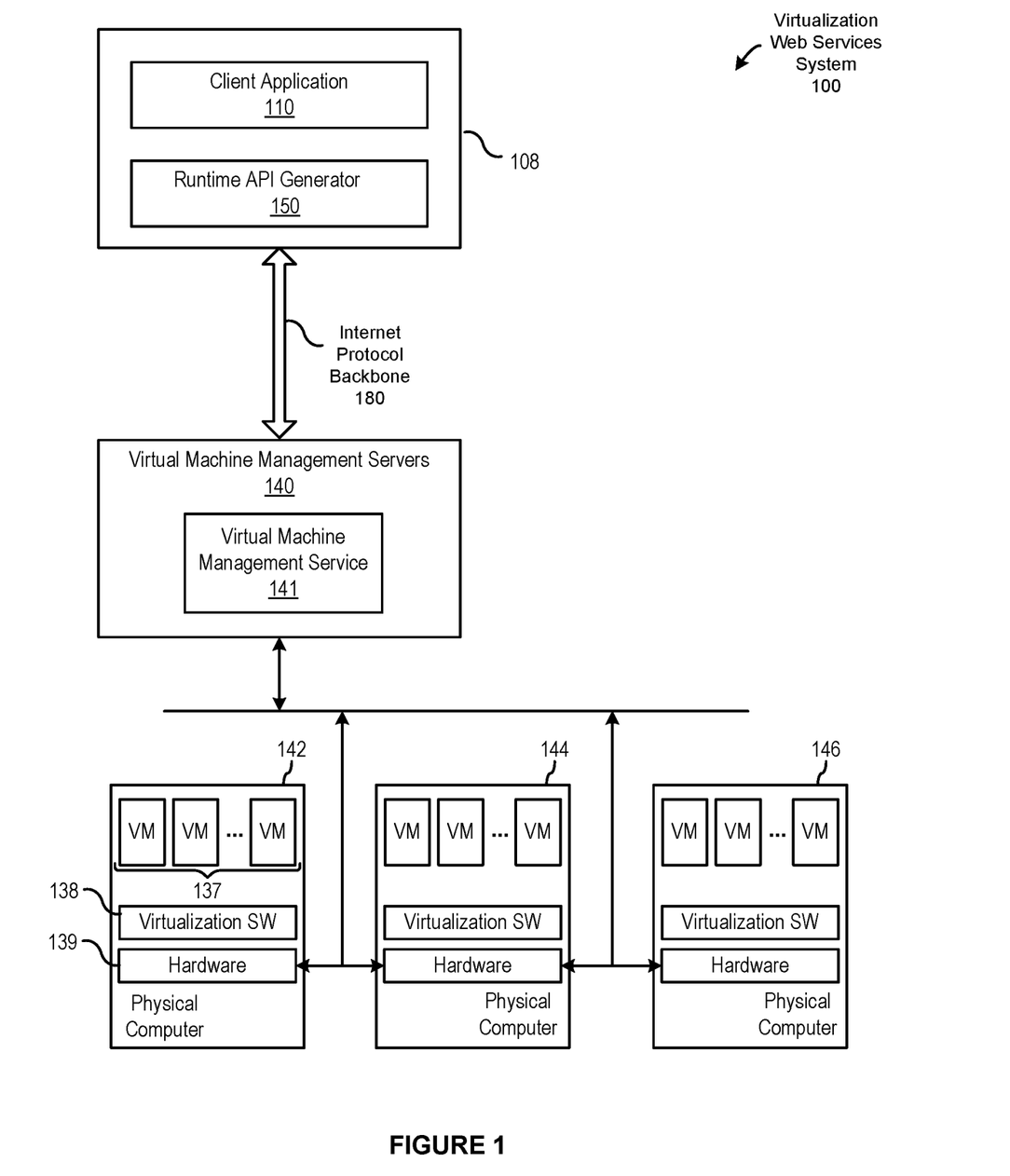
FIG. 1 illustrates components of a virtualization web services system in which one or more embodiments of the present invention may be implemented.

FIG. 1 illustrates components of a virtualization web services system 100 in which one or more embodiments of the present invention may be implemented. In virtualization web services system 100, client applications 110 run in an Internet browser via local devices, e.g., client machine 108. Runtime applications programming interface (API) 150 generator provides an interface for client applications 110 to invoke one or more virtual machine management services 141 via virtual machine management servers 140. Virtualized web services system 100 may include any number of virtual machine management services 401. In general, virtual machine management services 410 enable client applications 110 to manage virtual machines (VMs) 137 in a data center that is remote from the user locations, and virtual machine management servers 140 enable applications to execute inside VMs 137. In one embodiment, the virtual management servers are VMware® vCenter™ servers.

In the embodiments of the present invention, VMs 137 are instantiated on a plurality of physical computers 142, 144, 146, each of which includes virtualization software 138 and hardware 139 and is controlled by virtual machine management server 140. Virtualization web services system 100 may include any number of virtual machine management servers 140, and each virtual machine management server 140 may control any number of VMs 137.

Runtime API generator 150 and virtual machine management server 140 communicate via an internet protocol backbone 180. The remaining components of virtualization web services 100 communicate via either internet protocol backbone 180 or any number of communication networks. For simplicity, a single network is shown but it should be recognized that, in actual implementations, the components of virtualization web services system 100 may be connected over the same network or different networks. Furthermore, a particular configuration of the virtualized web services system is described above and illustrated in FIG. 1, but it should be recognized that one or more embodiments of the present invention may be practiced with other configurations of the virtualized desktop infrastructure.

In general, embodiments of the present invention may be implemented in any system that supports a defined communication mechanism for a client to request services from a server (i.e., RPC). In operation, runtime API generator 150 is typically downloaded and invoked locally to a client application, enabling communication with connected servers.

Figure 2:
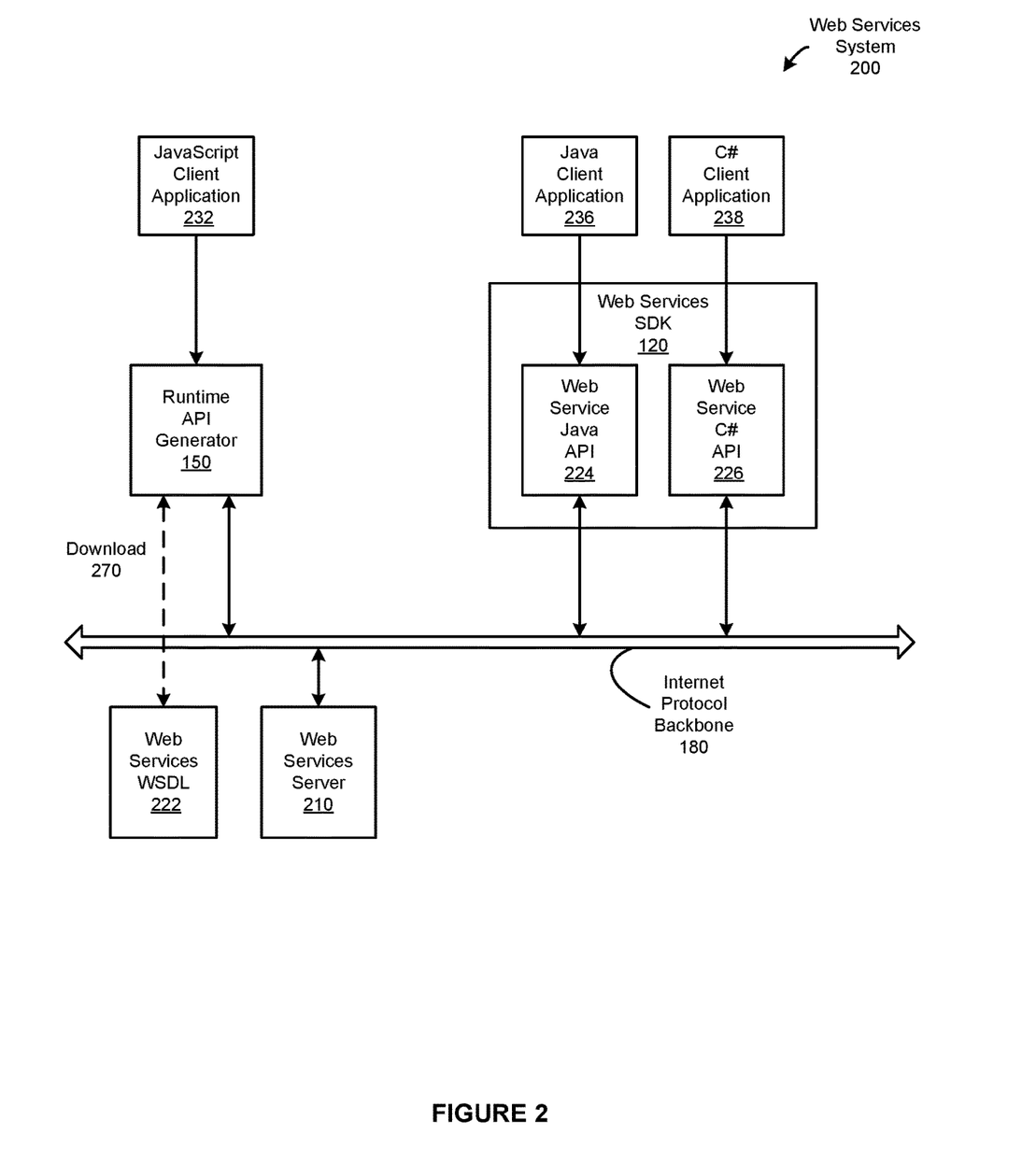
FIG. 2 illustrates components of a web services system that is configured to dynamically generate an application programming interface that exposes web services, according to one embodiment.

FIG. 2 illustrates components of a web services system 200 that is configured to dynamically generate an application programming interface (API) that exposes web services, according to one embodiment. Web services system 200 implements standard protocols to integrate client/server based applications connected by internet protocol backbone 180, such as the World Wide Web, independently of the platforms that execute the applications and the languages in which the applications are written. In particular, web services system 200 supports the Simple Object Access Protocol (SOAP) to communicate between client applications 110 and server applications via Extensible Markup Language (XML) encoded messages transported over the World Wide Web (WWW) using the Hypertext Transfer Protocol (HTTP). Further, web services system 200 includes descriptions of functionality provided by services and written in a standardized machine-readable interface definition language (IDL) known as the Web Services Description Language (WSDL).

Although one or more embodiments of the present invention are described herein in some detail for clarity of understanding, the described embodiments are to be considered as illustrative and not restrictive. In alternate embodiments, web services system 200 may be replaced with any system that interconnects client/server based applications using a Remote Procedure Call (RPC) protocol and is configured to generate an application programming interface (API) for a service at run-time based on a machine-readable description of the service. Further, any component or protocol implemented in web services system 200 may be replaced with a component or protocol that provides similar functionality. For example, client/server systems with communication protocols and interface functionality descriptions based on the JavaScript Object Notation (JSON) format instead of the XML format are envisioned. Another example is a service that implements a RESTful architecture (i.e., conforming to the representational state architecture constraints) and/or a dynamic discovery mechanism that exposes machine-readable service metadata.

As shown, web services system 200 includes, inter alia, Java client application 236 and C# client application 238. Because both Java and C# are both statically typed languages, pre-generated APIs written in these languages are able to fully support the services provided by web services server 210. To optimize the client development environment, a web services software development kit (SDK) 220 includes both a pre-generated Java application programming interface (API) 224 and a pre-generated web services C# API 226.

Code included in Java client application 236 accesses web services provided by a web services server 210 and exposed through web services Java application programming interface (API) 224. Web services Java API 224 and web services server 210 communicate using XML to transfer SOAP messages across internet protocol backbone 180. Similarly, code included in C# client application 238 accesses web services provided by web services server 210 and exposed through web services C# API 226, and web services C# API 226 communicates with web services server 210 via internet protocol backbone 180.

Web services system 200 also includes JavaScript client application 232. Since JavaScript does not support static data types, pre-generated APIs written in JavaScript are not necessarily able to comprehensively expose the web services provided by web services server 210. In particular, such a dynamically typed language may not support data types of information passed into and returned from methods provided by web services server 210. For this reason, embodiments provide runtime application programming interface (API) generator 150 that creates an API for services at runtime. In general, the API includes one or more interface "bindings" that provide glue code that communicates with an application in a particular programming language or protocol.

As shown, runtime API generator 150 generates interface bindings that link JavaScript client application 232 to the web services server 210 based on a web services WSDL 222 that describes both the methods and data types (i.e. objects) that web services server 210 exposes to client applications 110. Runtime API generator 150 typically executes at the client site, enabling communications between client application 232 and web services server 210 over internet protocol backbone 180 via SOAP messages. Runtime API generator 150 may be distributed in any technically feasible fashion. For instance, runtime API generator 150 may be bundled with web services SDK 220, web services WSDL 222, or web services server 210 or delivered in a language-specific format, such as a JavaScript library. Runtime API generator 150 may be written in any language capable of generating bindings at runtime and may include implementations in multiple languages.

In operation, JavaScript client application 232 invokes a method in JavaScript to request a connection to web services server 210. As part of responding to this request and establishing the connection, runtime API generator 150 downloads 270 web services WSDL 222. Runtime API generator 150 then parses web services WSDL 222 and stores relevant interface metadata in relatively easily accessible memory, such as memory or persistent storage local to client application 110. In alternate embodiments, runtime API generator 150 may perform any amount of preprocessing, including none, as part of establishing the connection. For instance, runtime API generator 150 may store web services WSDL 222 locally for processing individual components (such as method and data types) and defer additional processing of web services WSDL 222 in a "lazy" fashion.

Upon receiving an access request that targets a service provided by web services server 210, runtime API generator 150 dynamically creates and executes glue code required to properly service the request. In some embodiments, runtime API generator 150 generates the glue code (i.e., bridging instructions) for each component (i.e., method, data type, etc.) upon receiving the first access request to the component, stores the glue code, and retrieves the glue code in response to subsequent access requests to the component. In alternate embodiments, as part of initially parsing web services WSDL 222, runtime API generator 150 generates an API that includes glue code for all components documented in web services WSDL 222.

In alternate embodiments, web services system 200 may include any number of client applications 110 written in any number of different languages, and runtime API generator 150 may be configured to support any number of client applications 110 written in any number of languages. Runtime API generator 150 may be implemented in any number of modules written in any number of languages that enable implementation of the general techniques described herein. Web services system 200 may include any number of pre-generated APIs written in statically typed languages. The pre-generated API may be bound to client applications 110 either at compile time (compiled languages) or runtime (interpreted languages). In some embodiments, runtime API generator 150 is configured to generate version-agnostic APIs for statically typed languages that might otherwise be supported using pre-generated APIs. Advantageously, because runtime API generator 150 creates the methods and data types corresponding to web services WSDL 222 associated with web services server 210, the glue code reflects the current version of the service. By contrast, pre-generated APIs may not immediately be updated to match the current version of the service, potentially delaying access to newly exposed methods and data types.

Figure 3A:
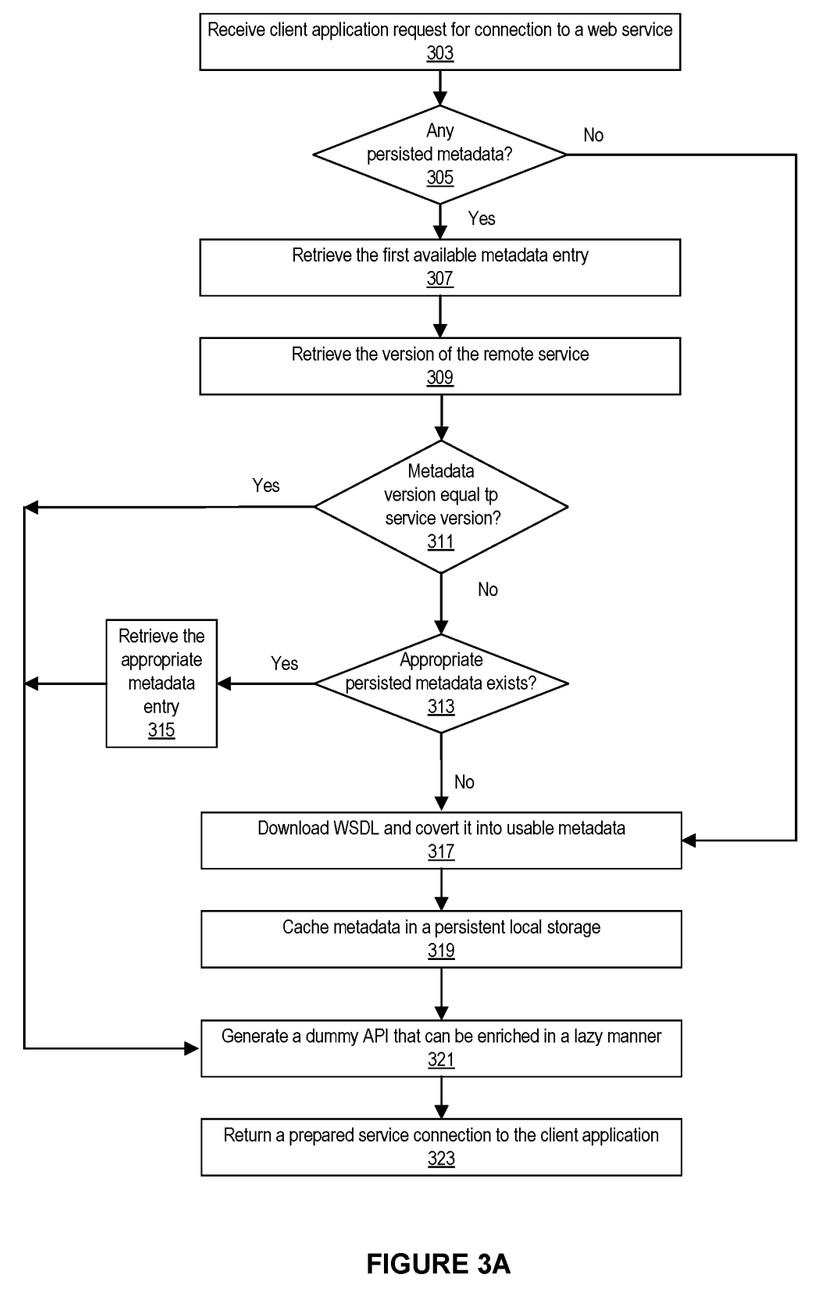
FIG. 3A depicts a flow-diagram of method steps for generating a connection that exposes web services to client applications at runtime, according to one embodiment.
Figure 3B:
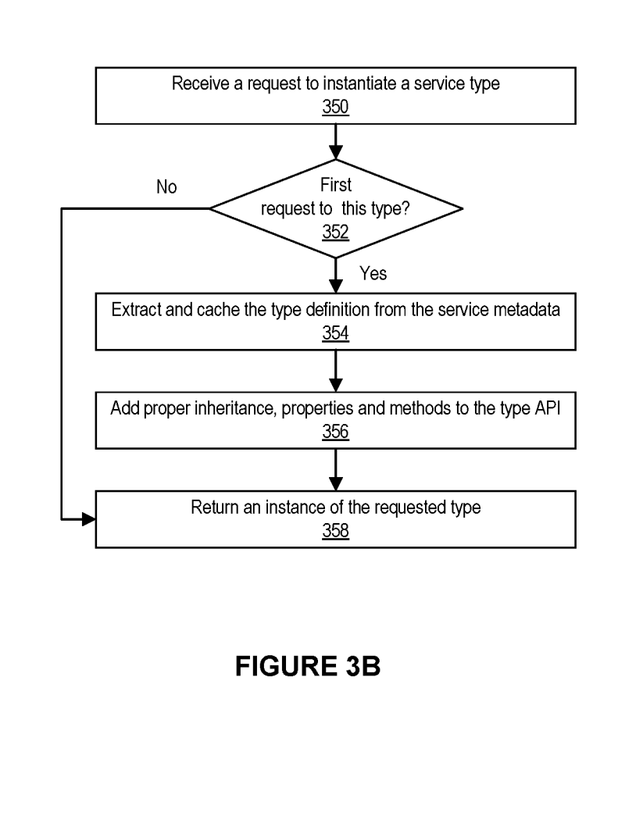
FIG. 3B depicts a flow-diagram of method steps for generating an instance of a requested service type at runtime, according to one embodiment.
Figure 3C:
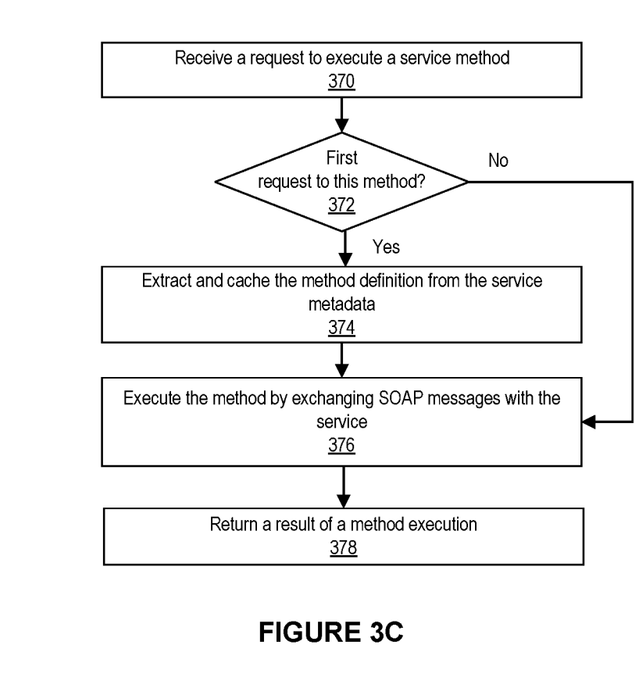
FIG. 3C depicts a flow-diagram of method steps for executing a requested service method at runtime, according to one embodiment.

FIG. 3A depicts a flow-diagram of method steps for generating a connection that exposes web services to client applications at runtime, according to one embodiment. FIG. 3B depicts a flow-diagram of method steps for generating an instance of a requested service type at runtime, according to one embodiment. FIG. 3C depicts a flow-diagram of method steps for executing a requested service method at runtime, according to one embodiment. Together, the method steps of FIGS. 3A, 3B, and 3C expose web services to client applications, according to one embodiment.

This method begins at step 303 where runtime API generator 150 receives a request to connect to web services server 210 from client application 110, such as JavaScript client application 232. Client application 110 may submit this request in any technically feasible fashion. For example, JavaScript client application 232 may include and then instantiate a JavaScript library that includes runtime API generator 150. As part of the instantiation, JavaScript client application 232 may provide a Uniform Resource Locator (URL) of a SOAP endpoint of a service provided by the web services server 210 or the host name of web services server 210.

In general, runtime API generator 150 downloads web services WSDL 222 and recursively gathers linked WSDL and XML, schema definition (XSD) files and/or retrieves cached metadata from a persistent local cache. In some embodiments, runtime API generator 150 creates a cache entry for each service version. In such an embodiment, runtime API generator 150 may include a service version as part of a request to retrieve cached metadata. In general, WSDL 222 and linked files and/or cached metadata define methods and data types exposed by web services server 210. Typically, such metadata defines methods, data types, and messages that are supported by web services server 210.

In alternate implementations, run time API generator 150 generates the complete set of interface bindings and does not cache any other interface metadata. In other embodiments, run time API generator 150 copies web services WSDL 222 and linked files to local memory to improve access efficiency, but "lazily" defers additional processing—subsequently parsing relevant files or portions of file on an as-required or on-demand basis.

At step 305, if runtime API generator 150 determines that there is no existing persisted metadata, then this method proceeds directly to step 317. At step 317, runtime API generator 150 downloads web services WSDL 222 and recursively gathers linked WSDL and XML schema definition (XSD) files and converts information included in these files into usable metadata. At step 319, runtime API generator 150 caches the metadata in a persistent local storage—creating a cache entry for the service version corresponding to the web services WSDL 222, and this method continues to step 321.

If, at step 305, runtime API generator 150 determines that there is persisted metadata, then this method proceeds to step 307. At step 307, runtime API generator 150 retrieves the first available metadata entry and the corresponding metadata version. At step 309, runtime API generator 150 retrieves the version of the remote service (i.e., service version). At step 311, if runtime API generator 150 determines that the metadata version equals the service version, then this method proceeds directly to step 321.

At step 311, if runtime API generator 150 determines that the metadata version does not equal the service version, then this method proceeds to step 313. At step 313, runtime API generator 150 determines whether appropriate persistent metadata exists. If appropriate persistent metadata exists, this method proceeds to step 315 where runtime API generator 150 retrieves the appropriate metadata entry, and then this method proceeds directly to step 321.

If, at step 313, runtime API generator 150 determines that appropriate persistent metadata does not exist, then runtime API generator 150 proceeds directly to step 317. At step 317, runtime API generator 150 downloads web services WSDL 222 and recursively gathers linked WSDL and XML schema definition (XSD) files and converts information included in these files into usable metadata. At step 319, runtime API generator 150 caches the metadata in a persistent local storage—creating a cache entry for the service version corresponding to the web services WSDL 222, and this method continues to step 321.

After generating or retrieving the desired granularity of interface metadata, runtime API generator 150 creates a dummy API that exposes the methods and data types exposed by web services server 210 and can be enriched in a lazy fashion (step 321). In some embodiments, runtime API generator 150 creates a proxy instance for access to the methods and data types exposed by the web services server 210. The proxy instance acts as a pass-through to generated interface bindings. Upon receiving the first access request to a particular method or data type, the proxy instance dynamically generates and caches the instructions that implement the corresponding interface binding. Upon receiving subsequent access requests to the particular method or data type, the proxy instance retrieves the instructions that implement the corresponding interface binding. In alternate embodiments, the proxy instance may be replaced with any technically feasible method of enabling such lazy functionality. In some embodiments, all interface bindings are generated and cached at step 319, and this method is modified to remove the steps that provide lazy functionality and to retrieve the generated interface bindings in response to all access requests (including the first). In other embodiments, this method is modified to remove the steps that provide lazy functionality and to generate the corresponding interface binding in response to all access requests.

At step 323, runtime API generator 150 negotiates a connection between client application 110 and web services server 210—establishing a communications channel over which messages are passed. Runtime API generator 150 then returns a prepared service connection instance to client application 110.

In some embodiments, runtime API generator 150 creates a proxy instance for access to the methods and data types exposed by the web services server 210. The proxy instance acts as a pass-through to generated interface bindings. Upon receiving the first access request to a particular method or data type, the proxy instance dynamically generates and caches the instructions that implement the corresponding interface binding. Upon receiving subsequent access requests to the particular method or data type, the proxy instance retrieves the instructions that implement the corresponding interface binding. In alternate embodiments, the proxy instance may be replaced with any technically feasible method of enabling such lazy functionality. In some embodiments, all interface bindings are generated and cached at step 319, and this method is modified to remove the steps that provide lazy functionality and to retrieve the generated interface bindings in response to all access requests (including the first). In other embodiments, this method is modified to remove the steps that provide lazy functionality and to generate the corresponding interface binding in response to all access requests.

FIG. 3B depicts a flow-diagram of method steps for generating an instance of a requested service type at runtime, according to one embodiment. Prior to the method steps of FIG. 3B, client application 110 causes runtime API generator 150 to generate a connection that exposes web services provided by web services server 210 The client application 110 may establish the connection in any technically feasible fashion, such as the method steps of FIG. 3A.

This method begins at step 350, where runtime API generator 150 receives a request to instantiate a service type exposed by web services server 210. At step 352, if runtime API generator 150 determines that the access request is the first access request to the service type, then this method proceeds to directly to step 358, where the runtime API generator 150 returns an instance of the requested service type and this method terminates. In some embodiments, runtime API generator 150 uses a proxy instance to efficiently implement step 352. In other embodiments, runtime API generator 150 may track access requests in any technically feasible fashion, consider all access requests as "first" access requests, or consider no access request as "first" access requests.

If, at step 352, runtime API generator 150 determines that the access request is the first access request to the service type, then this method proceeds to step 354. Runtime API generator 150 dynamically extracts the requested service type definition based on interface metadata (step 354) and adds proper inheritance, properties and methods to the service type API. Advantageously, since runtime API generator 150 generates the interface metadata at runtime, the service type definition is API version-agnostic (reflecting web services WSDL 222). By contrast, different versions of pre-generated APIs may not correspond to web services WSDL 222.

Notably, runtime API generator 150 caches the type definition to minimize redundant processing operations associated with subsequent access requests to this service type. Runtime API generator 150 may cache the type definition in any fashion and in any type of accessible memory. At step 358, runtime API generator 150 returns an instance of the requested service type and this method terminates.

FIG. 3C depicts a flow-diagram of method steps for executing a service method at runtime, according to one embodiment. Prior to the method steps of FIG. 3C, client application 110 causes runtime API generator 150 to generate a connection that exposes web services provided by web services server 210 The client application 110 may establish the connection in any technically feasible fashion, such as the method steps of FIG. 3A.

This method begins at step 370, where runtime API generator 150 receives a request to execute a service method exposed by web services server 210. At step 372, if runtime API generator 150 determines that the access request is not the first access request to the service method, then this method proceeds to directly to step 376. Alternative, if at step 372, runtime API generator 150 determines that the access request is the first access request to the service method, then this method proceeds to step 374. In some embodiments, runtime API generator 150 uses a proxy instance to efficiently implement step 372. In other embodiments, runtime API generator 150 may track access requests in any technically feasible fashion, consider all access requests as "first" access requests, or consider no access request as "first" access requests. At step 374, runtime API generator 150 dynamically extracts and caches the requested service method definition based on interface metadata.

At step 376, runtime API generator 150 executes the service method. As part of executing the service method, runtime API generator 150 exchanges SOAP messages with web services server 150. At step 378, runtime API generator 150 returns a result of the service method execution, and this method terminates.

Although the method steps of FIGS. 3A, 3B, and 3C are described in the context of web services system 200 and support for the SOAP and WSDL protocols, similar method steps may be used to provide comprehensive runtime generation of APIs in any system that supports a defined communication mechanism for a client to request services from a server (i.e., RPC). In operation, runtime API generator 150 is typically downloaded and invoked locally to client application 110, enabling communication with connected servers.

Figure 4A:
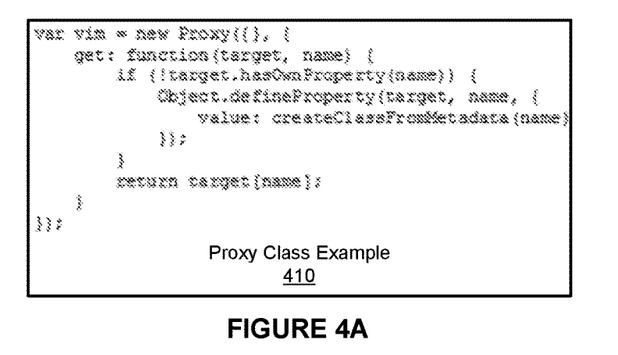
FIG. 4A is a conceptual diagram that illustrates code that implements a proxy class implemented by runtime application programming interface generator, according to one embodiment.
Figure 4B:
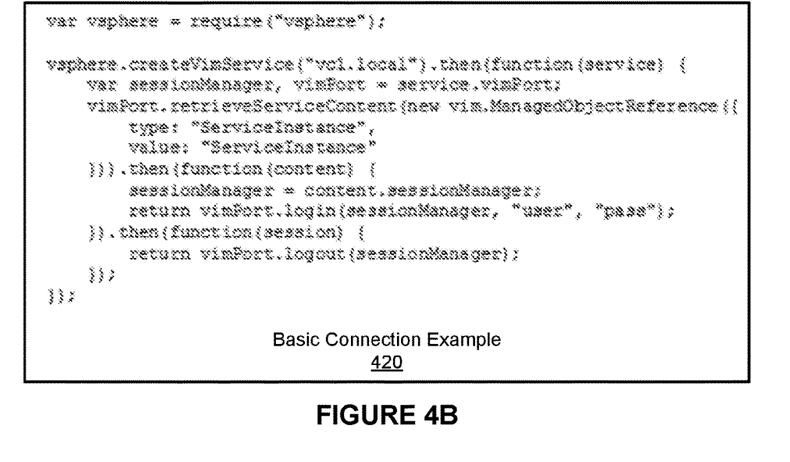
FIG. 4B is a conceptual diagram that illustrates code that implements a basic connection to a service provided by web services server, according to one embodiment.
Figure 4C:
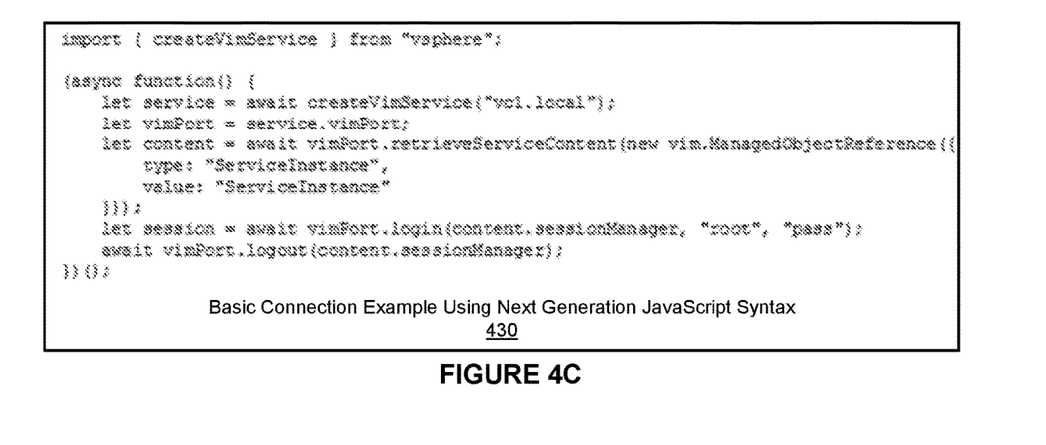
FIG. 4C is a conceptual diagram that illustrates code that implements a basic connection to a service provided by web services server, according to another embodiment.

FIG. 4A is a conceptual diagram that illustrates code that implements a proxy class implemented by runtime application programming interface generator 150, according to one embodiment. FIG. 4B is a conceptual diagram that illustrates code that implements a basic connection to a service provided by web services server 210, according to one embodiment. FIG. 4C is a conceptual diagram that illustrates code that implements a basic connection to a service provided by web services server 210, according to another embodiment For illustrative purposes only, both FIG. 4A, and FIG. 4B depict code that is written in JavaScript. FIG. 4C depicts code that is written in the next generation of JavaScript. In general, runtime API generator 150 leverages features of the implementation language and supported protocols to optimize the interface binding (i.e., glue code) that links the methods and data type invocations in the code of client applications 110 to implementations provided by the server. In alternate embodiments, such functionality may include similar constructs to the ones detailed herein, or may leverage different features of the implementation language and supported protocols to optimize the generated interface bindings.

The context of FIGS. 4A and 4B is that runtime API generator 150 leverages features provided by JavaScript to optimally connect JavaScript client application 232 to services provided by web VMware's vSphere® product, virtualization software that is commercially available from VMware, Inc. of Palo Alto, Calif.

FIG. 4A depicts the code for a proxy class example 410. Proxies are a key feature of JavaScript that facilitates processing interface metadata on-demand to optimize the initialization performance of runtime API generator 150. In this example, vSphere.js uses a single proxy instance which provides access to vSphere® types.

As shown, proxy class example 410 maintains "target" as a cache for the glue code. Upon receiving the first access to a data type, runtime API generator 150 inspects interface metadata, dynamically creates JavaScript representation (i.e., glue code), and stores the JavaScript representation in target. The same approach is also applied to service methods.

FIG. 4B depicts the code for a basic connection example 420. In operation, runtime API generator 150 produces JavaScript "Promise" instances that can be chained in a readable programming flow while preserving the asynchronous nature of the underlying communication with the remote service. Upon execution, basic connection example 420 implements the following:

Downloads https://vcl.local/sdk/viServices.wsdl and recursively gathers all linked WSDL and XSD files.

Executes basic Document Object Model (DOM) queries against the downloaded XML documents and extracts the required interface metadata related to this web service endpoint.

Stores the interface metadata in a persistent local storage so that the above steps are no longer needed for this specific service version.

Generates a number of "Proxy" instances that define a "catch all" getter which is used for lazy generation of service types like "vim.ManagedObjectReference" or service operations like "vimPort.retrieveServiceContent". This mechanism dramatically reduces the interface metadata processing during initialization.

Instantiates and provides a service instance.

Executes a number of remote service operations and instantiates the corresponding data types. Transparently handles the required SOAP serialization and de-serialization.

FIG. 4C depicts the code for a basic connection example using next generation JavaScript syntax 430. In alternate embodiments, proxies may be replaced with any technically feasible method of providing "lazy" functionality. In other embodiments, the implementation of proxies may be altered to exploit more commonly supported features of languages. In one alternate embodiment, the number of "lazy" access points will be equal to the number of data types that web services server 210 exposes—eliminating the single object in proxy class example 410 that provides access to the data types.

For illustrative purposes, the techniques described herein have been described in the context of a "web services system" that supports both the SOAP and WSDL protocols, and client applications written in specific languages. In alternate embodiments, these techniques may be applied in the generalized context of any client/server based system that supports RPC and includes machine readable description of a provided service.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with any host and client computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims.

In the claims, elements and/or steps do not imply any particular order of operation, unless explicitly stated in the claims.

Many variations, modifications, additions, and improvements to the client/server system are possible. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

I claim:

1. A method of dynamically generating an application programming interface that enables a client to access a service provided by a server comprising:
    receiving a request to connect to the server that provides the service, and in response thereto, connecting to the server;
    downloading an interface definition language file, wherein the interface definition languages file defines the service;
    generating, at the client, interface metadata based on the interface definition language file, wherein the interface metadata includes methods, data types, and messages supported by the server; and
    in response to a request for the service, executing a remote procedure call that causes the server to carry out the service, wherein the remote procedure call is determined based on the interface metadata.

2. The method of claim 1, wherein the interface definition language file specifies at least one method and one data type.

3. The method of claim 1, wherein the interface definition language file is written in Web Services Description Language format.

4. The method of claim 1, wherein executing the remote procedure call comprises:
    creating a message that invokes a remote method corresponding to the request, wherein the message is formatted to comply with an interface protocol supported by the server; and
    transmitting the message to the server.

5. The method of claim 4, wherein the interface protocol is Simple Object Access protocol.

6. The method of claim 4, wherein the request is received from a client, and further comprising:
    receiving a reply to the message from the server;
    extracting a value from the message; and
    returning the value to the client.

7. The method of claim 1, wherein executing the remote procedure call comprises implementing a call-back function.

8. The method of claim 1, wherein executing the remote procedure call comprises invoking an object that implements an asynchronous function and returns a status that indicates whether the asynchronous function succeeded.

9. The method of claim 8, wherein the remote procedure call is written in JavaScript and the object is a Promise object.

10. The method of claim 1, wherein the remote procedure call is determined by:

identifying a method corresponding to the request; and if a previous request for the method has been received, then retrieving the remote procedure call from a cache; and if a previous request for the method has not been received, then generating the remote procedure call based on the interface metadata, and storing the remote procedure call in a cache.

11. The method of claim 1, wherein the request is received via a web browser.

12. The method of claim 1, wherein the service exposes virtualization functionality.

13. A non-transitory computer-readable storage medium comprising instructions, which when executed in a client computer system causes the client computer system to carry out the steps of:

receiving a request to connect to a server that provides a service, and in response thereto, connecting to the server;

downloading an interface definition language file, wherein the interface definition languages file defines the service;

generating, at the client, interface metadata based on the interface definition language file, wherein the interface metadata includes methods, data types, and messages supported by the server; and in response to a request for the service, executing a remote procedure call that causes the server to carry out the service, wherein the remote procedure call is determined based on the interface metadata.

14. The non-transitory computer-readable storage medium of claim 13, wherein the interface definition language file specifies at least one method and one data type.

15. The non-transitory computer-readable storage medium of claim 13, wherein the interface definition language file is written in Web Services Description Language format.

16. The non-transitory computer-readable storage medium of claim 13, wherein executing the remote procedure call comprises:

creating a message that invokes a remote method corresponding to the request, wherein the message is formatted to comply with an interface protocol supported by the server; and transmitting the message to the server.

17. A client computing device connected to a server that is configured to provide a service that is specified in an interface definition language file, the client computing device comprising a processor programmed to execute code stored in a memory, to dynamically generate an application programming interface that enables a client application running in the client computing device to access a service provided by the server, the code including steps comprising:

receiving a request to connect to the server that provides the service, and in response thereto, connecting to the server;

downloading an interface definition language file, wherein the interface definition languages file defines the service;

generating, at the client, interface metadata based on the interface definition language file, wherein the interface metadata includes methods, data types, and messages supported by the server; and in response to a request for the service, executing a remote procedure call that causes the server to carry out the service, wherein the remote procedure call is determined based on the interface metadata.

18. The client computing device of claim 17, wherein the interface definition language file specifies at least one method and one data type.

19. The client computing device of claim 17, wherein the interface definition language file is written in Web Services Description Language format.

20. The client computing device of claim 17, wherein executing the remote procedure call comprises:

creating a message that invokes a remote method corresponding to the request, wherein the message is formatted to comply with an interface protocol supported by the server; and transmitting the message to the server.

* * * * *